US006632505B2

(12) United States Patent
Nozawa et al.

(10) Patent No.: US 6,632,505 B2
(45) **Date of Patent: *Oct. 14, 2003**

(54) MATERIAL TO BE PRINTED BY AN INK-JET PRINTER

(75) Inventors: Takashi Nozawa, Tochigi (JP); Tetsuya Abe, Tochigi (JP); Katsumi Tajima, Tochigi (JP)

(73) Assignee: Sony Chemicals Corp., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/486,557

(22) PCT Filed: Jul. 3, 1998

(86) PCT No.: PCT/JP98/03005

§ 371 (c)(1),
(2), (4) Date: Mar. 7, 2000

(87) PCT Pub. No.: WO00/01534

PCT Pub. Date: Jan. 13, 2000

(65) Prior Publication Data

US 2002/0160158 A1 Oct. 31, 2002

(51) Int. Cl.[7] .............................. B32B 3/00; B32B 3/12; B32B 27/04; B32B 3/26

(52) U.S. Cl. .................... 428/137; 428/117; 428/300.7; 428/304.4; 428/195

(58) Field of Search ................................. 428/195, 117, 428/300.7, 304.4, 137

(56) References Cited

U.S. PATENT DOCUMENTS 3,861,952 A * 1/1975 Tokumoto et al. .......... 117/217
4,912,014 A * 3/1990 Feldman ..................... 430/202

FOREIGN PATENT DOCUMENTS

EP 0 663 300 A1 * 12/1994

* cited by examiner

*Primary Examiner*—Bruce H. Hess
*Assistant Examiner*—L. Ferguson
(74) *Attorney, Agent, or Firm*—Oliff & Berridge, PLC

(57) ABSTRACT

A printing material containing a white layer and an absorption layer formed on a base material made of a resin film. The base material may be black and opaque, while the white layer contains titanium oxide. The absorption layer may contain a protein and absorbs aqueous inks. The white layer is hydrophilic and thus highly compatible with aqueous inks which have permeated the absorption layer and reached the white layer, thereby giving a vivid image. The printing material may be used in an advertising poster adhered to a windowpane of a bus, etc. by forming a number of holes in the printing material.

5 Claims, 2 Drawing Sheets

Fig.1(a)
Fig.1(b)
Fig.1(c)
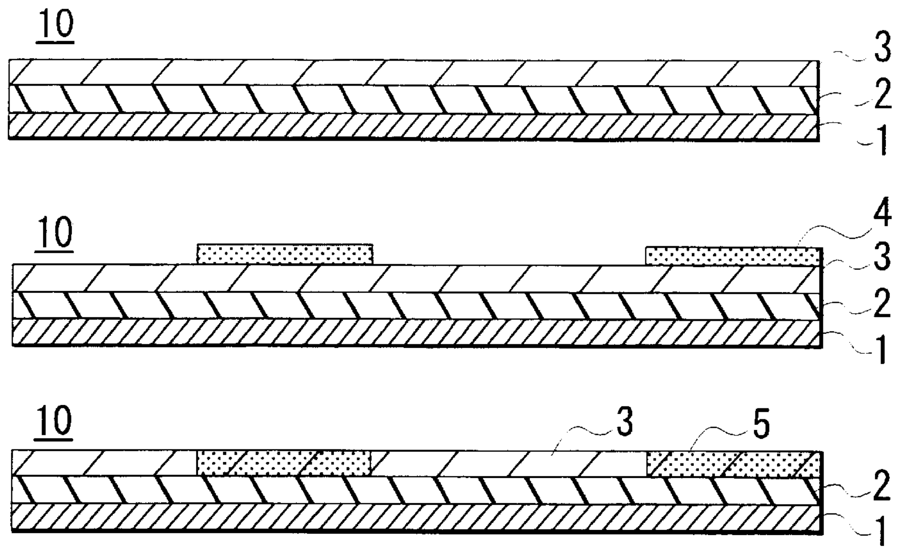
Fig.2
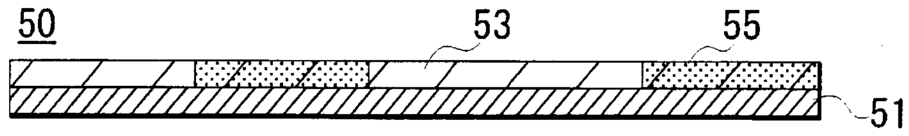
Fig.3(a)
Fig.3(b)
Fig.3(c)
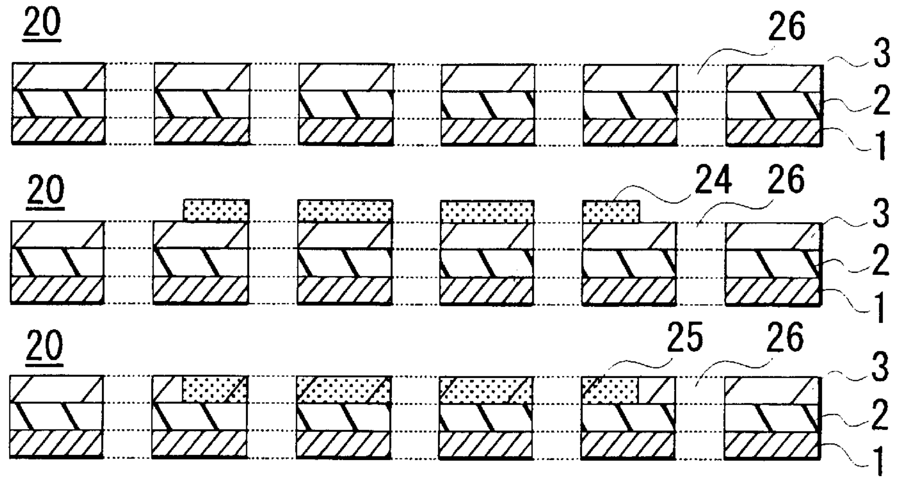

MATERIAL TO BE PRINTED BY AN INK-JET PRINTER

TECHNICAL FIELD

This invention relates to the technical field of printing materials. More particularly, it relates to a printing material suitable for ink jet printers.

BACKGROUND ART

Advertising posters have been adhered to windowpanes of buses and trains, windows in buildings, etc. It has been a practice to produce these advertising posters by multi-color printing. Thus, printing materials exclusively for multi-color printing are printed by using ink jet printers to give vivid color images.

When such an advertising poster is adhered to, for example, a windowpane of a bus, it is needless to say that the printed face should be seen from the outside. Moreover, it is favorable that the poster cannot be seen in the bus because of its shielding effect but the sun. can be shining in through it and passengers can look out of the window owing to its light transmission properties.

In FIGS. 4(*a*) and (*b*), the numerical symbol 100 stands for an advertising poster of the above-described type wherein an image 107 is formed on a printing material 110.

In this printing material 110, a synthetic paper 102 is adhered to a base material 101 made of a black resin film and a number of holes 106 piercing through the base material 101 and the synthetic paper 102 are formed.

After forming the holes 106 in the printing material 110, an aqueous ink is sprayed onto the synthetic paper 102 with an ink jet printer. When the aqueous ink 105 permeating the synthetic paper 102 is fixed, a desired image 107 is formed.

In a case of using this advertising poster 100, it is adhered to a windowpane from the inside with the synthetic paper 102 having the image formed thereon facing to the window. Thus, the image 107 faces outside so that it can be seen by pedestrians. Although the black base material 101 faces inside, passengers can look out of the window through the holes 106. In this case, the inside of the bus cannot be seen from the outside, since the holes 106 are very small.

Since a desired advertisement can be economically made by using the advertising poster 100, the demand for posters of this type has been increasing in recent years. However, an image printed on the synthetic paper 102 by using an aqueous ink is blurred, which makes the image 107 on the advertising poster 100 of the conventional art unclear.

DISCLOSURE OF THE INVENTION

The present invention, which has been made to overcome the above-mentioned troubles encountering in the prior art, aims at providing a printing material on which a vivid image can be printed by using ink jet printers.

To achieve this object, the printing material according to the present invention consists of a base material made of a resin film, a white layer formed on the base material, and an absorption layer formed on the white layer. The above-mentioned white layer contains titanium oxide and a hydrophilic resin, while the above-mentioned absorption layer contains a water-absorbing resin. Moreover, the base material, the white layer and the absorption layer are provided with a number of holes piercing therethrough.

The term "hydrophilic resin" means a resin which wets without repelling water (i.e., having no hydrophobic nature)

but does not swell with water. Water-soluble resins and water-insoluble ones both fall within the scope of the hydrophilic resin. In the present invention, use can be made of, for example, a polyvinyl resin as this hydrophilic resin.

On the other hand, the term "water-absorbing resin" means a resin which swells with water but is insoluble in water. Owing to these characteristics, an aqueous ink can permeate the water-absorbing resin. In the present invention, use can be made of protein in this water-absorbing resin.

In the present invention, it is advantageous for forming an advertising poster that the base material is a black one.

BRIEF DESCRIPTION OF THE DRAWINGS

FIG. 1(*a*) provides a sectional view of an example of the printing material according to the present invention. FIG. 1(*b*) provides a sectional view schematically showing the printing material onto which an aqueous ink is sprayed by using an ink jet printer. FIG. 1(*c*) provides a sectional view schematically the printing material wherein the aqueous ink has permeated the absorption layer.

FIG. 2 provides a sectional view of a comparative example wherein the aqueous ink permeates.

FIG. 3(*a*) provides a sectional view of an example of the printing material according to the present invention provided with holes, while FIG. 3(*b*) provides a sectional view schematically showing this printing material onto which an aqueous ink is sprayed by using an ink jet printer. FIG. 3(*c*) provides a sectional view schematically showing the printing material wherein the aqueous ink has permeated the absorption layer.

BEST MODE FOR CARRYING OUT THE INVENTION

Figure 4:
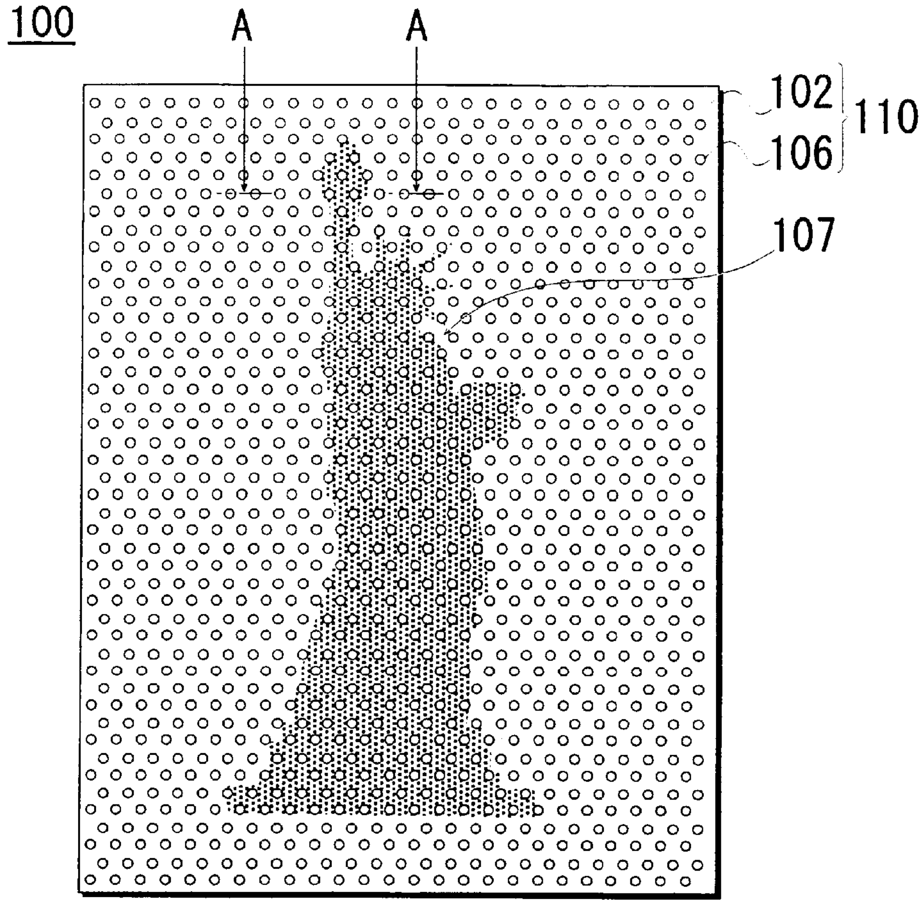
FIG. 4(*a*) provides a plan view of an advertising poster produced with the use of an ink jet printer while FIG. 4(*b*) provides a schematic sectional view of this advertising poster.
Figure 4:
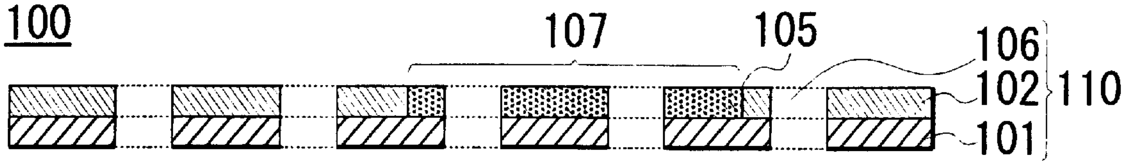

In FIGS. 1(*a*) to 1(*c*), the numerical symbol 10 stands for the printing material according to the present invention.

In this printing material 10, a white layer 2 is formed on a base material 1 and an absorption layer 3 is formed on the white layer 2, as FIG. 1(*a*) shows.

Now, an example of the process for producing this printing material 10 will be described. First, a black resin film (for example, polyethylene terephthalate (PET) film) having a thickness of about 50 $\mu$m was prepared as the base material 1.

A titanium oxide dispersion (LN643A manufactured by Resinocolor) was prepared and a POVAL-modified vinyl alcohol polymer (MK2175 manufactured by Teikoku Kagaku), having both hydrophilic nature and water resistance, was added as hydrophilic resin to the dispersion. After mixing by stirring, the resultant mixture was applied onto the base material 1 to give a predetermined thickness and dried. Thus, the hydrophilic resin exerted an effect as a binder resin on the titanium oxide, thereby giving a white layer 2 of about 10 $\mu$m in film thickness.

Next, protein (a natural protein) having an average particle size of 5 $\mu$m (WR450 manufactured by Idemitsu Petrochemical) Was applied, as a water-absorbing resin, onto the white layer 2 and dried to thereby form an absorption layer 3 (film thickness: about 30 $\mu$m) Thus, the printing material 10 of Example 1 according to the present invention was obtained.

Although the base material 1 of this printing material 10 has a black color, the water-absorbing resin (protein) is a white resin and the titanium oxide powder is a white pigment. When this printing material 10 is observed from the side of absorption layer 3, therefore, it is white and opaque. When it is observed from the side of the base material 1, in contrast, it is black and opaque.

To use the printing material 10 as described above, it is put in an ink jet printer in such a manner that the absorption layer 3 faces the,printing head and then an aqueous ink is sprayed onto the absorption layer 3 from the printing head.

In FIG. 1(*b*), the numerical symbol 4 schematically stands for the aqueous ink sprayed onto the absorption layer 3. Owing to the high water absorptivity of the protein, the aqueous ink 4 immediately permeates the absorption layer 3. In FIG. 1(*c*), the numerical symbol 5 stands for the aqueous ink which has permeated the absorption layer 3.

Since the hydrophilic resin (the POVAL-modified vinyl alcohol polymer in this case) contained in the white layer 2 has a hydrophilic nature and water resistance, it is highly compatible with the aqueous ink reaching the white layer 2. Since the degree of hydrophilicity of the hydrophilic resin in the white layer 2 is lower than that of the hydrophilic resin in the absorption layer 3, the aqueous ink 5 having permeated the absorption layer 3 is sustained in the vicinity of the surface of the white layer 2 and fixed therein. In this step, the white layer 2 is exposed to the aqueous ink. However, the hydrophilic resin in the white layer 2 is not dissolved in the aqueous ink 5 owing to its water resistance. Thus, a vivid printed image can be obtained.

Table 1 shows the evaluation data of the printing material 10 as described above (Example 1).

TABLE 1

| | Evaluation data | | | | | | |
|---|---|---|---|---|---|---|---|
| | Ink-absorp-tivity | Blur-ring | Water resis-tance | Color density | White-ness | Shield-ing effect | Film crack-ing |
| Ex. 1 | ○ | ○ | ○ | 1.35 ○ | 87.1 | ○ | ○ |
| Ex. 2 | ○ | ○ | Δ | 1.09 x | 90.3 | ○ | Δ |
| Ex. 3 | ○ | ○ | Δ | 1.36 ○ | 85.4 | ○ | ○ |
| C. Ex. 1 | ○ | ○ | ○ | 1.24 x | 80.7x | ○ | x |
| C. Ex. 2 | ○ | x | ○ | 0.94 x | 89.2 | ○ | x |
| C. Ex. 3 | ○ | x | x | 1.27 x | 95.0 | ○ | ○ |

The item "blurring" was evaluated by printing lines at intervals of 200 μm on the printing material 10 and the blurred outlines were examined with the naked eye. A sample showing no blurring was regarded as "O" while one wherein adjacent lines united together due to blurring was regarded as "x".

The item "color density" means the evaluation of the dullness and gloss of the printed image. The printing material 10 was subjected to black printing and the reflection density of the printed matter was measured with a Macbeth densitometer. A sample showing a reflection density of 1.3 or above was regarded as "O" while one showing a reflex density less than 1.3 was regarded as "x".

The item "water resistance" was evaluated by subjecting the printing material 10 to full-color printing, cutting the printing material into small pieces, soaking the pieces in water filled in a container for 48 hours at room temperature, then taking out the pieces from water and observing changes in the printed matter with the naked eye.

A sample causing any change neither in the printed matter nor in the water was regarded as "O", one causing a slight change in the water color by dissolved printed matter was regarded as "Δ", and one wherein a part of the absorption layer 3 was released and dissolved from the base material 1 into the water is regarded as "x".

The item "whiteness" was measured with the use of a color difference meter (CR221 manufactured by Minolta Camera) after the formation of the white layer 2 on the black base material 1. Since the base material 1 has a black color, a higher whiteness indicates the better shielding effect. In Table 1, a sample showing a whiteness of 85% or above was regarded as "O" wile one having a whiteness less than 85% was regarded as "x".

Regarding the item "shielding effect", a sample wherein the back face cannot be seen before printing was ranked higher. When the black base material 1 was used, however, all samples were evaluated good.

The item "film cracking" was evaluated by folding the printing material 10 so as to make the absorption layer 3 top surface and examining with the naked eye the cracking and falling-out of the coating film (the white layer 2 and the absorption layer 3) at the folded point. A sample showing neither cracking nor falling out was regarded as "O" wile one suffering therefrom was regarded as "x".

Although samples showing evaluation results "Δ" are usable in practice, those having evaluation results "x", except the item of color density, cannot be put into practical use.

As Table 1 indicates, the printing material 10 of Example 1as described above shows favorable results in all of the evaluation items.

The numerical symbol 20 in FIG. 3(*a*) stands for a printing material wherein a number of holes (diameter: 3 mm) piercing through the absorption layer 3, the white layer 2 and the base material 1 are formed in the printing material 10 shown in FIG. 1(*a*). When the aqueous ink 24 is sprayed onto the surface of the absorption layer 3 as shown in FIG. 1(*b*), the ink layer 25 permeating the absorption layer 3 is sustained at the white layer 2, as shown in FIG. 1(*c*). Thus, a vivid image can be obtained similar to the case of Example 1.

Next, a white layer was formed on the base material by using an acrylic resin (JULYMER SP=50T, manufactured by Nippon Junyaku) as a substitute for the POVAL-modified vinyl alcohol polymer as the hydrophilic resin in the white layer and dispersing a titanium oxide powder as such in the acrylic resin as a substitute for the titanium oxide dispersion. Subsequently, the same absorption layer as that of Example 1 was formed thereon to give a printing material.

In this case, the same materials as Example 1, except the white layer, were employed and the production conditions were also identical with those employed in Example 1.

Then the thus obtained printing material was evaluated as in Example 1. The results are given in Table 1 (Example 2).

Since the hydrophilic resin employed in the white layer was different, the printing material of Example 2 suffered from some film cracking. Moreover, it was somewhat inferior in the color density and water resistance to the product of Example 1, though no trouble was caused thereby in practical utilization.

Next, a white layer was formed on the base material by using an nondenaturation polyvinyl alcohol polymer (PVA 235, manufactured by Kuraray) as a substitute for the POVAL-modified vinyl alcohol polymer employed in Example 1 as the hydrophilic resin in the white layer. Subsequently, the same absorption layer as that of Example 1 was formed thereon to give a printing material. In this case, the same materials as Example 1, except the hydrophilic resin in the white layer, were employed and the production conditions were also identical with those employed in Example 1.

Then the thus obtained printing material was evaluated as in Example 1. The results are given in Table 1 (Example 3). Since the hydrophilic resin employed in the white layer was an nondenaturation one, the printing material of Example 3 was somewhat inferior in the water resistance to the product of Example 1, though no trouble was caused thereby in practical utilization.

Next, a printing material 50 was formed, as a comparative example, by forming an absorption layer 52 directly on the base material 51, as shown in FIG. 2. Then the thus obtained printing material was evaluated as in Example 1.

The data of Comparative Example 1 given in Table 1 indicate the results of the evaluation of this printing material wherein the same: materials as those in Example 1 were used as the base material 51 and the absorption layer 52.

In Comparative Example 2 given in Table 1, the same material as in Example 1 was used as the base material 51. However, the absorption layer 52 was formed by dispersing a titanium oxide powder and adding the protein and polyester resin and a hardly yellowing polyurethane resin to the same protein as used in Example 1.

In Comparative Example 3, a printing material 110 was formed by adhering a synthetic paper 102 to a base material 101, as shown in FIG. 4(*b*).

As Table 1 shows, the sample of Comparative Example 1, which had no layer containing white pigment (titanium oxide), was inferior in whiteness due to the yellowing caused by protein. Since the white pigment (titanium oxide) used in Comparative Example 2 had no hydrophilic nature, the aqueous ink permeated the water-absorbing resin 52 nonuniformly, thereby resulting in a low color density.

Although the above description is made on printing materials having a water-absorbing resin exposed on the surface, printing materials wherein a transparent resin film is laminated on the surface of the water-absorbing resin after printing also fall within the scope of the present invention.

Industrial Applicability

As described above, the printing material according to the present invention is suitable for ink jet printing and a vivid image can be obtained thereby with the use of aqueous inks. Thus, multi-color printed advertising posters with high qualities can be obtained thereby economically.

What is claimed is:

1. A printing material which consists of:

a base material made of a resin film;

a white layer formed on said base material; and an absorption layer formed on said white layer; characterized in that:

said white layer contains titanium dioxide and a hydrophilic resin;

said absorption layer contains a water-absorbing resin; and said base material, said white layer and said absorption layer are provided with a number of holes piercing through each of the layers.

2. The printing material as claimed in claim 1, characterized in that said hydrophilic resin has water resistance.

3. The printing material as claimed in claim 2, characterized in that said hydrophilic resin is a polyvinyl synthetic resin.

4. The printing material as claimed in claim 3, characterized in that said water-absorbing resin contains protein.

5. The printing material as claimed in claim 4, characterized in that said base material has a black color.

* * * * *